(12) United States Patent
Rauch et al.

(10) Patent No.: US 7,617,060 B1
(45) Date of Patent: Nov. 10, 2009

(54) EXTRACTING HIGHER ORDER INFORMATION FROM SCENE-BASED SHACK-HARTMANN WAVE-FRONT SENSING

(75) Inventors: Herbert E. Rauch, Los Altos, CA (US); Dragos B. Maciuca, Mountain View, CA (US); Gopal Vasudevan, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 226 days.

(21) Appl. No.: 11/829,061

(22) Filed: Jul. 26, 2007

Related U.S. Application Data

(60) Provisional application No. 60/836,672, filed on Aug. 10, 2006.

(51) Int. Cl.
*G06F 19/00* (2006.01)
(52) U.S. Cl. ............... 702/85; 356/124; 356/124.5; 359/554; 382/100; 382/254; 702/105
(58) Field of Classification Search .......... 356/124, 356/124.5, 127, 432; 359/554, 577, 578, 359/579; 382/100, 254; 702/1, 85, 105, 702/127, 189
See application file for complete search history.

(56) References Cited

U.S. PATENT DOCUMENTS

| | | | | |
|---|---|---|---|---|
| 4,271,355 A | * | 6/1981 | Wisner et al. | 250/201.9 |
| 5,120,128 A | * | 6/1992 | Ulich et al. | 356/121 |
| 5,166,508 A | * | 11/1992 | Davis et al. | 250/201.9 |
| 5,350,911 A | * | 9/1994 | Rafanelli et al. | 250/201.9 |
| 6,163,381 A | * | 12/2000 | Davies et al. | 356/521 |
| 7,038,791 B2 | * | 5/2006 | Smith | 356/520 |
| 7,129,455 B2 | * | 10/2006 | Webb et al. | 250/201.9 |
| 7,350,920 B2 | * | 4/2008 | Levine | 351/206 |
| 2004/0239876 A1 | * | 12/2004 | Levine | 351/206 |
| 2005/0006559 A1 | * | 1/2005 | Smith | 250/201.9 |
| 2005/0254112 A1 | * | 11/2005 | Webb et al. | 359/224 |
| 2006/0049331 A1 | * | 3/2006 | Smith | 250/201.9 |

OTHER PUBLICATIONS

Poyneer; Scene-based Shack-Hartmann wave-front sensing: analysis and simulation; Applied Optics; Oct. 10, 2003; pp. 5807-5815; vol. 42, No. 29.

(Continued)

*Primary Examiner*—Edward R Cosimano
(74) *Attorney, Agent, or Firm*—McDermott Will & Emery LLP

(57) ABSTRACT

An adaptive optics system is provided, comprising a deformable mirror configured to receive an input beam with an aberrated wavefront and to reflect the input beam to a Shack-Hartmann wavefront sensor array. The system further comprises the Shack-Hartmann wavefront sensor array configured to receive the input beam from the deformable mirror, and to generate a plurality of sub-images from the input beam. The system further comprises a processor configured to measure, for each sub-image, two linear coefficients corresponding to a local wavefront aberration of the sub-image and to estimate, for each sub-image, three quadratic coefficients corresponding to the local wavefront aberration of the sub-image. The processor is further configured to reconstruct the aberrated wavefront of the input beam based on the measured linear coefficients and the estimated quadratic coefficients, and to provide control signals based upon the reconstructed wavefront to the deformable mirror to mitigate aberrations in the input beam.

19 Claims, 6 Drawing Sheets

OTHER PUBLICATIONS

Gottsfeld Brown; A Survey of Image Registration Techniques; ACM Computing Surveys-Department of Computer Science, Columbia University; Jan. 12, 1992; pp. 1-60.

Zitova et al.; Image registration methods: a survey; Image and Vision Computing; Jun. 2003; pp. 977-1000; vol. 21.

Looze; Minimum variance control structure for adaptive optics systems; J. Opt. Soc. Am. A; Mar. 2006; pp. 603-612; vol. 23, No. 3.

Paschall et al.; Linear quadratic Gaussian control of a deformable mirror adaptive optics system with time-delayed measurements; Applied Optics; Nov. 1, 1993; pp. 6347-6358; vol. 32. No. 31.

Petit et al.; First laboratory demonstration of closed-loop Kalman based optimal control for vibration filtering and simplified MCAO; Advances in Adaptive Optics II; Proc. Of SPIE; (2006); vol. 6272, 62721T.

Hinnen et al.; Adaptive Optics $H_2$-optimal Control Design Applied on an Experimental Setup; Advances in Adaptive Optics II; Proc. Of SPIE (2006)vol. 6272, 62722S-1.

Lee; Loopshaped wavefront control using open-loop reconstructors; Optic Express; 2006; Vol. 14, No. 17.

Redding et al.; Adaptive Optics Reconstruction Utilizing Super-Sampled Deformable Mirror Influence Functions; Proc. SPIE; vol. 3353; Sep. 1998; pp. 1-9.

* cited by examiner

EXTRACTING HIGHER ORDER INFORMATION FROM SCENE-BASED SHACK-HARTMANN WAVE-FRONT SENSING

CROSS-REFERENCE TO RELATED APPLICATION

The present application claims the benefit of priority under 35 U.S.C. § 119 from expired U.S. Provisional Patent Application Ser. No. 60/836,672, entitled "EXTRACTING HIGHER ORDER INFORMATION FROM SCENE-BASED SHACK-HARTMANN WAVE-FRONT SENSING," filed on Aug. 10, 2006, the disclosure of which is hereby incorporated by reference in its entirety for all purposes.

STATEMENT REGARDING FEDERALLY SPONSORED RESEARCH OR DEVELOPMENT

Not applicable.

FIELD OF THE INVENTION

The present invention generally relates to adaptive optics and, in particular, relates to extracting higher order phase information from a Shack-Hartmann wavefront sensor.

BACKGROUND OF THE INVENTION

Adaptive optics systems are used to estimate and correct phase aberrations along an optical path. One way to estimate phase aberrations involves using small sub-images produced by a Shack-Hartmann sensor array. The Shack-Hartmann sensor array creates a number of small sub images of either a reference point source or an image scene. The degree of phase aberrations in the incoming wavefront can be determined, as each of the sub-images is shifted by some amount due to local phase slopes. Using this information, the overall wavefront phase can be reconstructed by combining the local phase slopes from each of the sub-images. While this approach provides some ability to reconstruct an aberrated wavefront, further improvements in wavefront reconstruction are desired.

SUMMARY OF THE INVENTION

In certain embodiments of the present invention, Shack-Hartmann data is processed to determine local quadratic phase information (in addition to linear phase slopes) to improve wavefront reconstruction and subsequent feed-back control in an adaptive optics system. The least squares procedure for estimating local quadratic parameters finds the best fit between the reference image and each of the Shack-Hartman sub-images. The gradient of the reference image with respect to the appropriate quadratic parameters (influence function) is calculated using Fourier analysis. Computation requirements to estimate the quadratic information are minimized because gradients and other least squares operations are calculated for the reference image alone, and not for the individual sub-images.

According to one embodiment of the present invention, an adaptive optics system comprises a deformable mirror configured to receive an input beam with an aberrated wavefront and to reflect the input beam to a Shack-Hartmann wavefront sensor array. The system further comprises the Shack-Hartmann wavefront sensor array configured to receive the input beam from the deformable mirror, and to generate a plurality of sub-images from the input beam. The system further comprises a processor configured to measure, for each sub-image, two linear coefficients corresponding to a local wavefront aberration of the sub-image and to estimate, for each sub-image, three quadratic coefficients corresponding to the local wavefront aberration of the sub-image. The processor is further configured to reconstruct the aberrated wavefront of the input beam based on the measured linear coefficients and the estimated quadratic coefficients, and to provide control signals based upon the reconstructed wavefront to the deformable mirror to mitigate aberrations in the input beam.

According to one embodiment of the present invention, a method of mitigating aberrations in an input beam with an aberrated wavefront comprises the steps of receiving the input beam with a Shack-Hartmann wavefront sensor, generating, with the Shack-Hartmann wavefront sensor, a plurality of sub-images from the input beam, measuring, for each sub-image, two linear coefficients corresponding to a local wavefront aberration of the sub-image, estimating, for each sub-image, three quadratic coefficients corresponding to the local wavefront aberration of the sub-image, reconstructing the aberrated wavefront of the input beam based on the measured linear coefficients and the estimated quadratic coefficients, and providing control signals based upon the reconstructed wavefront to a deformable mirror to mitigate aberrations in the input beam.

According to one embodiment of the present invention, a machine-readable medium carries one or more sequences of instructions for mitigating aberrations in an input beam with an aberrated wavefront. Execution of the one or more sequences of instructions by one or more processors causes the one or more processors to perform the steps of generating, with a Shack-Hartmann wavefront sensor, a plurality of sub-images from an input beam, measuring, for each sub-image, two linear coefficients corresponding to a local wavefront aberration of the sub-image, estimating, for each sub-image, three quadratic coefficients corresponding to the local wavefront aberration of the sub-image, reconstructing the aberrated wavefront of the input beam based on the measured linear coefficients and the estimated quadratic coefficients, and providing control signals based upon the reconstructed wavefront to a deformable mirror to mitigate aberrations in the input beam.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Adaptive Optics

Atmospheric disturbances can cause phase aberrations along an optic path. To estimate and correct these phase aberrations, adaptive optics systems are used. One way to estimate phase aberrations is through small sub-images produced by a Shack-Hartmann sensor array. A Shack-Hartmann wavefront sensor includes an array of lenses (called lenslets) of the same focal length, each of which is focused onto a camera or photon sensor (e.g., a CCD array, a CMOS, a quad-cell, etc.) to produce a sub-image thereupon. The local tilt of the wavefront across each lenslet can be calculated from the position of the sub-image on the sensor, and any phase aberration can be approximated to a set of discrete tilts. The overall wavefront phase is reconstructed by combining local phase slopes from each of the sub-images. Estimating phase slopes gives two pieces of information for each sub-image, (e.g., two coefficients representing local linear phase, spatial derivatives x and y). Further processing of the Shack-Hartmann sensor data can determine the local rate-of-change of slope at those selected points (i.e., three additional coefficients representing local quadratic phase $x^2$, $y^2$, and xy).

Before describing an adaptive optics system, it is useful to explain how real-time estimation of quadratic phase coefficients can improve the performance of such a system. Two areas with potential for improvement are (a) system diagnostics and (b) operational systems that use local curvature actuation or moment actuation. System diagnostics require special measurements to characterize unobserved modes to help evaluate system performance. For example, "waffle" mode aberrations in a deformable mirror are unobservable by the feedback control, but these aberrations do affect system performance. Real-time information about such unobservable modes can help in test bed and system diagnostics. Local curvature actuation or moment actuation use influence functions that map to alternative sensors which detect local curvature instead of slope. The same wavefront sensor that measures local slope can provide real-time higher order phase information to implement local curvature actuation or moment actuation.

Figure 1:
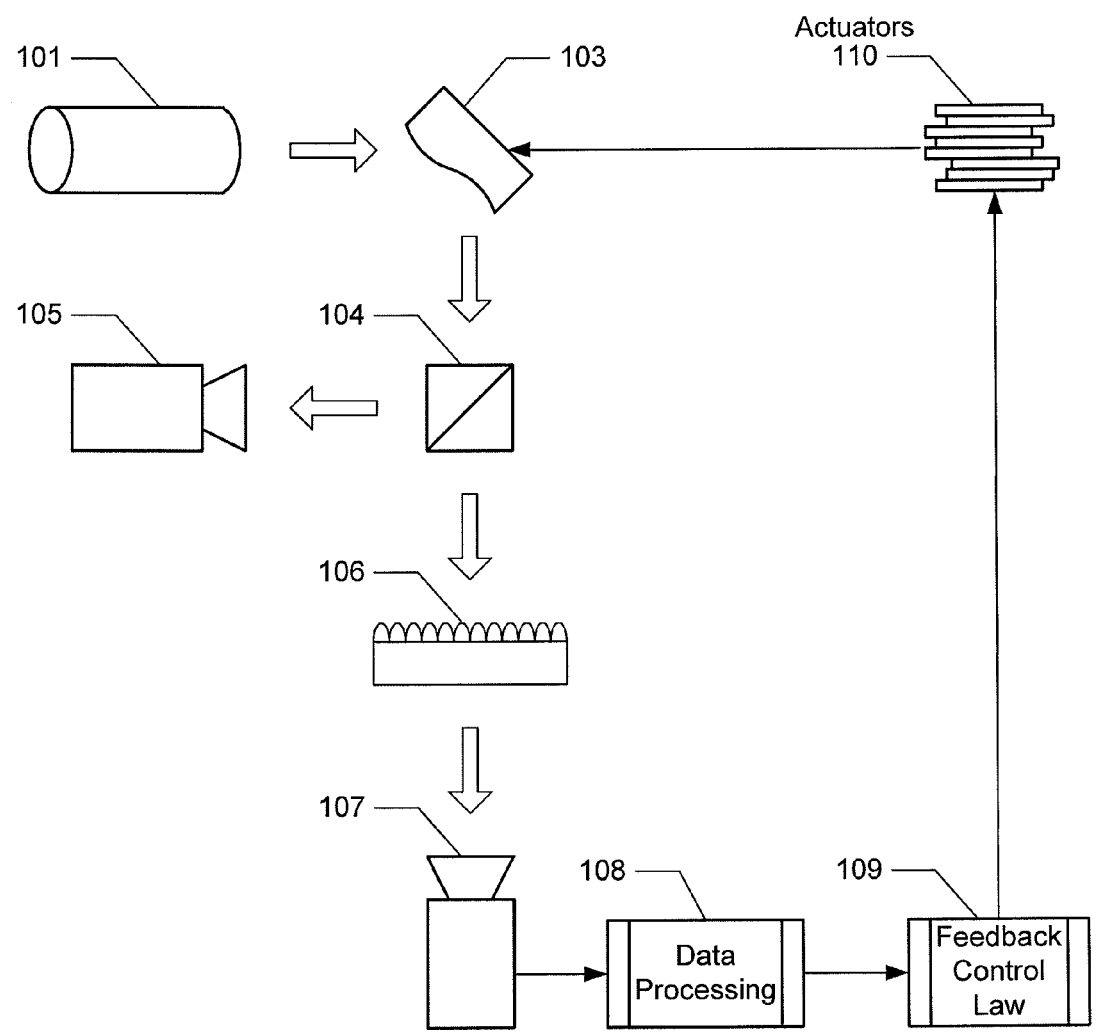
FIG. 1 illustrates a block diagram of an adaptive optics system in accordance with one embodiment of the present invention.

With this background, it is appropriate to consider the block diagram of an adaptive optics system shown in FIG. 1 in accordance with one embodiment of the present invention. The light from the external scene goes through the telescope 101 to the deformable mirror ("DM") 103. The light is reflected back from DM 103 to a beamsplitter 104, which diverts some of the light to the scene camera 105. The remaining light is diverted by beamsplitter 104 to the wavefront sensor 106 and then to the sensor camera 107. The information from the sensor camera 107 goes through data processing 108 to feed into the control law 109 which gives commands to multiple actuators 110 that adjust DM 103.

The input to Shack-Hartmann wavefront sensor 106 is the incoming disturbed wavefront, and the output therefrom to sensor camera 107 is a set of sub-images. In accordance with one aspect of the present invention, wavefront sensor 106 has a 7-by-7 array of lenslets that produces 49 separate sub-images. Each sub-image represents the same external image, but it is distorted by the local wavefront phase at the lenslet center. For the purpose of data processing, one of the 49 sub-images is treated as the reference image, and it is compared to each of the remaining 48 sub-images. Each sub-image-reference-pair is processed, using correlation techniques to produce two measurements of relative wavefront slope at the lenslet center (linear phase in the x direction and the y direction). The 48 sub-images, when compared with the reference image, produce 96 distinct outputs (48 relative linear coefficients in the x direction and 48 in the y direction). The data processing 108 compares the same 48 sub-images to the reference image and produces 240 distinct outputs (96 linear phase coefficients and 144 quadratic phase coefficients).

The information from data processing 108 goes to the feedback control law 109 which gives commands to the multiple mirror actuators 110. The mirror actuators push, pull, or otherwise warp the deformable mirror 103. Initial commands to the actuators 110 stress the mirror 103 so it is as flat as possible. Subsequent commands to the actuators 110 change the reflected wavefront by inducing slopes or local gradients in the deformable mirror 103 surface height.

The feedback control law 109 combines the two functions of wavefront reconstruction and mirror actuator commands. The inputs to the control law are slope information from the sub-images, and the outputs are commands to the deformable mirror 103. The feedback control law 109 has at least two additional constraints. There is nothing to prevent all the actuators 110 pushing in the same direction (without changing wavefront slope). Therefore, one constraint is that some "average value" of all actuator motion must be zero. If all the actuators push in a "waffle" or "checker board" pattern (e.g., plus minus plus minus), the wavefront sensor 106 might not be able to detect that motion. Therefore, the second constraint is that the overall "waffle" value for actuator motion must be zero.

Estimating Quadratic Phase Coefficients

When quadratic phase coefficients are estimated in an operational adaptive optics system according to one aspect of the present invention, it is anticipated that the feedback control law will operate in two modes. In the first mode, the feedback control law will consider only linear phase, and it will use linear phase measurements to reduce distortion to small values. In the second mode, the feedback control law will use both linear and quadratic phase measurements. Operating in two modes will insure that effects from linear phase disturbances are relatively small when making quadratic phase measurements. The estimation procedure described herein uses linear phase effects that are relatively small, so they do not dominate quadratic phase effects.

According to one aspect of the present invention, the least-square estimation procedure involves five steps: modifying the reference image, creating gradient images, estimating quadratic phase using least squares, resolving sign ambiguities for each sub-image pair and resolving sign ambiguities for the whole wavefront.

Least-squares is a common way to estimate unknown variables by making a best fit between measurements and variables. Under certain conditions, the least-square procedure produces "minimum-mean-square-error" in the estimate. In the present exemplary embodiment, least-squares is used to make the best fit between the reference image and each of the subsequent sub-images. The first step in using least-squares is to model the change in the reference image due to changes in quadratic phase coefficients. Fourier analysis is used to artificially create changes in the reference image due to changes in quadratic coefficients. The additional computation burden to compute Fourier transforms is minimal because transforms are done once on the reference image, and not on the sub-images. The second step in least-squares is to create sensitivity functions to the unknown variables. In this case, numerically determined gradients of the images are the sensitivity functions. The third step is to perform the least-squares estimate. The computation burden to perform one-step least square estimation is minimal because most of the calculations are done once with the reference image, and not on the sub-images.

The remaining difficulty arises because quadratic phase coefficients involve focus, so there is ambiguity in sign (i.e., plus or minus). Sign ambiguities are first resolved analytically for each pair of sub-images. Then the remaining sign ambiguities are resolved analytically over the whole wavefront. The resolution of those remaining sign ambiguities requires performing a second set of calculations over all the sub-images. There is one remaining sign ambiguity, over the whole wavefront, and this must be resolved by a special sensor. After this overview, it is appropriate to examine the estimation procedure in detail.

Modifying the Reference Image

The wavefront of the original reference image is modified by adding phase w(x,y) as shown in Equation 1, where $c_k$ represents two linear and three quadratic phase coefficients and (x,y) represent spatial parameters centered in the middle of the image.

$$w(x,y)=c_1 x+c_2 y+c_3 x^2+c_4 y^2+c_5 xy \quad (1)$$

The x and y variables are dimensionless because they are normalized to have a zero value at the center of the sub-image and unit value at the edges. The coefficients $c_k$ are also dimensionless because the phase w is in radians (which can be considered dimensionless). Small coefficient values like 0.1 and 0.01 are considered to be reasonable in the following analysis.

The sensitivity to the two linear phase coefficients ($c_1$ and $c_2$) can be represented by sub-image translation, so their Fourier representation will not be considered here. The effects of the three quadratic parameters on the modified reference are obtained here using Fourier representation.

The estimation procedure starts with a reference image (designated $R_0$) and a scene image (designated S and containing the "to be estimated" aberrations). The procedure itself has three parts: (a) create modified reference images with known aberrations, (b) numerically difference the modified reference images to obtain associated sensitivity functions, and (c) use the sensitivity functions to implement a one-step least-square procedure to estimate the quadratic parameters in the scene image.

The creation of the modified reference image has three parts: (i) create the Fourier Transform of the original reference image; (ii) multiply the Fourier Transform of the reference, element-by-element, by the appropriate Optical Transfer Function; and (iii) take the inverse Fourier Transform to give the appropriate modified reference image.

Before presenting the Optical Transfer Function, it is useful to define two auxiliary functions, the triangle function (designated by Λ) and the sinc function (designated by sinc), defined here.

$$\Lambda(u)=1-abs(u) \quad abs(u)<1, \text{ and zero otherwise} \quad (2)$$

$$\text{sinc}(u)=\sin(\pi u)/(\pi u) \quad (3)$$

The Optical Transfer Function is designated by $H(f_x, f_y)$ where $f_x$ and $f_y$ are spatial frequencies in the x and y directions, having units of cycles per distance. Normalized versions of the two spatial frequencies are designated $f_1$ and $f_2$. The Optical Transfer Function for a square aperture with quadratic aberrations $c_3$, $c_4$, and $c_5$, can be written explicitly as follows.

$$H(f_x,f_y)=\Lambda(f_1)\Lambda(f_2)\text{sinc}[(8c_3 f_1+4c_5 f_2)\Lambda(f_1)]\text{sinc}[(8c_4 f_2+4c_5 f_1)\Lambda(f_2)] \quad (4)$$

where $f_1=f_x/(2f_0)$ and $f_2=f_y/(2f_0)$ are normalized spatial frequencies, $f_0$=cutoff frequency=$w/(\lambda z_i)$, 2w=width of square aperture, λ=wavelength in dielectric medium, and $z_i$=distance form the exit pupil to the image.

The special case where $c_5$ is zero and $c_3$ and $c_4$ are equal is called a focus error. The first two triangle functions in Equation (4) are due to the finite size of the optics, and they must be included in the simulation. In the operational system, the effect of the optics has already modified both the reference image and the scene image, so the first two triangle functions are not included in the data processing.

When the three quadratic coefficients are zero, the two sinc functions have zero argument, and they are each equal to unity. Thus, when the quadratic coefficients are zero, the Optical Transfer Function in Equation (4) includes the effects of the finite size of the optics, but does not include any aberrations.

Creating Gradient Images

The gradient of the original reference image with respect to the appropriate quadratic parameter is called the sensitivity function. The sensitivity function is obtained by differencing the modified reference and the original reference, where the modified reference has included a small value for the appropriate quadratic parameter. The expression for the Optical Transfer Function in Equation (4) contains the sinc function shown in Equation (5a). For the purpose of this explanation, the sinc function can be approximated by the quadratic in Equation (5b) when the argument (ε) is small.

$$\text{sinc}(\epsilon)=\sin(\pi\epsilon)/(\pi\epsilon) \quad (5a)$$

$$\text{sinc}(\epsilon)\approx 1-(\pi\epsilon)^2/6 \quad (5b)$$

Figure 2:
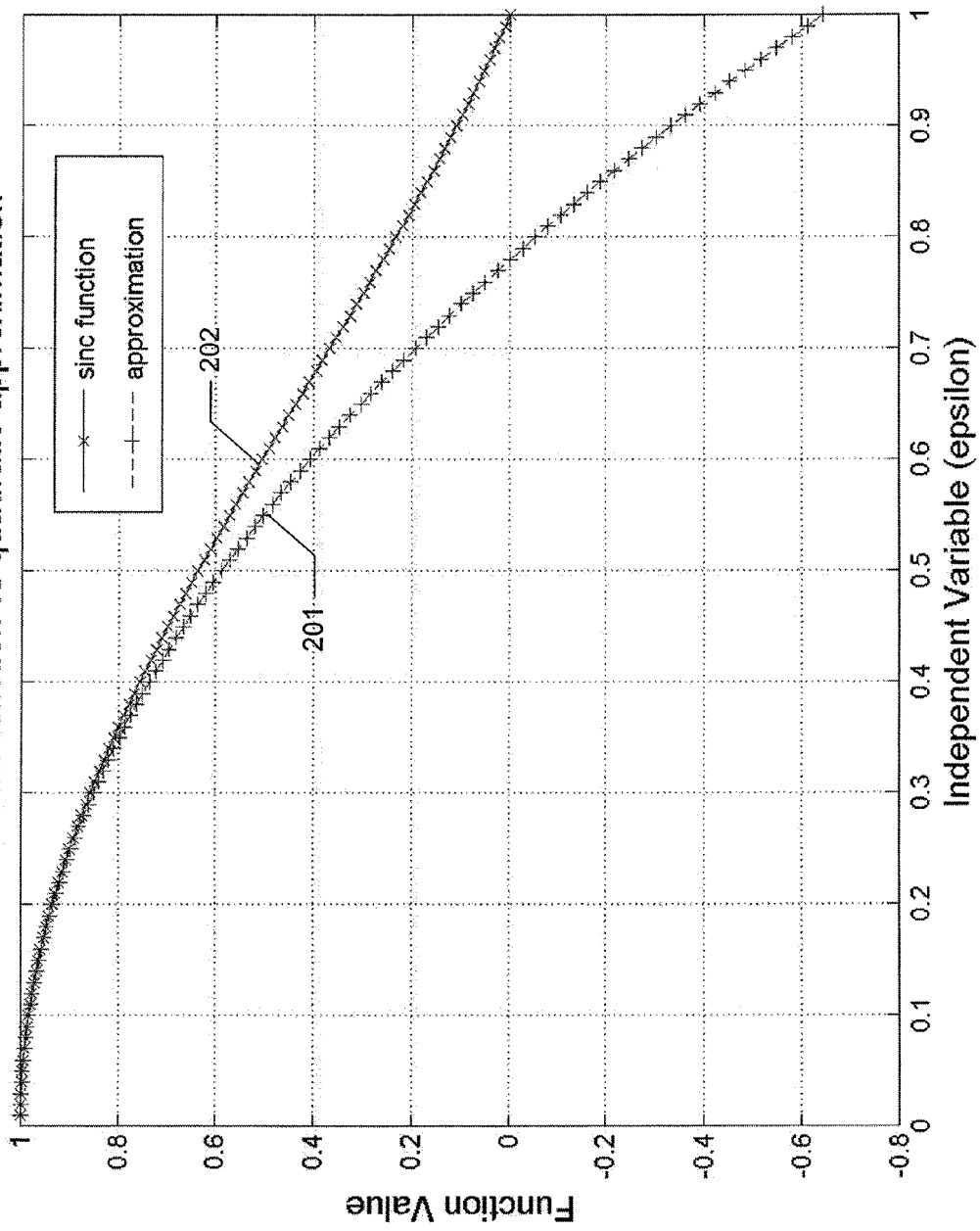
FIG. 2 shows a comparison of the sinc function and the quadratic approximation as a function of the argument ($\epsilon$) in accordance with one aspect of the present invention.

FIG. 2 shows a comparison of the sinc function 201 and the quadratic approximation 202 as a function of the argument (ε) in accordance with one aspect of the present invention. When the argument of the sinc function 201 is small (representing small quadratic phase aberrations), the sinc function 201 can be approximated as a quadratic 202. In accordance with one aspect of the present invention, the sensitivity function for the small introduced quantity ε is proportional to sinc(ε) minus one, so it is approximately proportional to ε squared. Hence, the sensitivity function will be proportional to the square of introduced coefficient $c_3$, $c_4$, or $c_5$.

In the notation used herein, parameters $p_1$ and $p_2$ are equal to the linear coefficients $c_1$ and $c_2$. Parameters $p_3$, $p_4$ and $p_5$ are equal to the squares of the three quadratic coefficients, (i.e. $c_3^2$, $c_4^2$, $c_5^2$). Two additional parameters $p_6$ and $p_7$ are introduced to equal cross terms in the square due to the sinc function. Parameters $p_6$ and $p_7$ are equal to the cross terms $c_3$ $c_5$ and $c_4 c_5$, respectively. Examination of the Optical Transfer Function in Equation (4) and the approximation in Equation (5) shows there is no cross term due to the product $c_3 c_4$. Experimental simulation results verify that there is no term due to the product $c_3 c_4$.

The image gradients, or sensitivity functions, for the five quadratic parameters $p_3$ through $p_7$ are designated $G_3$ through $G_7$. To create these five gradients, it is necessary to create five modified reference images, designated $R_3$ through $R_7$. The small changes in the three dimensionless quadratic coefficients are set at the small value $\epsilon$. The coefficient values for the original reference image and the five modified reference images are shown below where terms to the right of the arrow ($\rightarrow$) show notation for the approximate effect.

$R_0$ has $c_3=0, c_4=0, c_5=0 \rightarrow 1$ $R_3$ has $c_3=\epsilon, c_4=0, c_5=0 \rightarrow 1+c_3^2$ $R_4$ has $c_3=0, c_4=\epsilon, c_5=0 \rightarrow 1+c_4^2$ $R_5$ has $c_3=0, c_4=0, c_5=\epsilon \rightarrow 1+c_5^2$ $R_6$ has $c_3=\epsilon, c_4=0, c_5=\epsilon \rightarrow 1(c_3+c_5)^2$ $R_7$ has $c_3=0, c_4=\epsilon, c_5=\epsilon \rightarrow 1+(c_4+c_5)^2$ (6)

The five gradients $G_3$ through $G_7$ have the values show below, where terms to the right of the arrow ($\rightarrow$) show coefficients represented by the gradient parameter. The expressions for the last two gradients ($G_6$ and $G_7$) are more complicated, because they must remove square terms while keeping cross terms.

$G_3 = R_3 - R_0 \rightarrow c_3^2$ $G_4 = R_4 - R_0 \rightarrow c_4^2$ $G_5 = R_5 - R_0 \rightarrow c_5^2$ $G_6 = (R_6 + R_0 - R_3 - R_5)/2 \rightarrow c_3 c_5$ $G_7 = (R_7 + R_0 - R_4 - R_5)/2 \rightarrow c_4 c_5$ (7)

If the images have excessive noise, averaging adjacent gradient pixel values is one way to reduce the effect of noise on the gradient. For example, averaging five adjacent gradient values (up, down, right, left) can reduce the root-mean-square gradient noise by the square root of five. Averaging a three-by-three array of pixels can reduce the rms gradient noise by a factor of three. The drawback to averaging gradient pixels is that it reduces sensitivity to small changes.

Estimating Quadratic Phase Using Least Squares

The estimation of the two linear phase coefficients ($c_1$ and $c_2$) requires determining the spatial shift (x and y directions) between the reference image and each of the sub-images. The procedure to determine $c_1$ and $c_2$ first finds the best whole pixel shift (with minimum pixel sum-squared-difference), and then uses parabolic interpolation to find the best sub-pixel shift.

The least squares procedure presented here is used to estimate the five parameters $p_3$ though $p_7$ (representing quadratic coefficients $c_3^2, c_4^2, c_5^2, c_3 c^5$ and $c_4 c_5$). If desirable, the same least squares procedure can be extended to estimate seven parameters, including estimation of $p_1$ and $p_2$ (equal to linear coefficients $c_1$ and $c_2$). Estimation of all seven parameters at once has been verified in simulation.

Implementation of least squares estimation leads to the following equation, where the vector v has components $v_k$, the symmetric matrix M has components $m_{jk}$, and the parameter vector p has components $p_k$.

$v = Mp$ (8)

The solution for the parameter vector p is obtained by taking the inverse of the symmetric matrix M.

$p = \text{inv}(M)v$ (9)

The components $v_k$ of the vector v and $m_{jk}$ of the matrix M can be calculated directly as follows where superscript prime (') indicates transpose, and the summation sign ($\Sigma$) indicates multiplying two matrices, element-by-element, and adding together the element products.

$v_k = \Sigma G_k'[R_0 - S]$ (10)

$m_{jk} = \Sigma G_j' G_k$ (11)

The terms $v_k$ for the vector v are calculated for each sub-image S. However, the terms $m_{jk}$ for the matrix M involve only the gradient matrices $G_i$ that are determined from the reference image. Hence, the matrix M (and its inverse) is calculated only once for the reference image at the beginning of the calculations, reducing the computational burden.

Resolving Sign Ambiguities for Each Sub-Image

The three parameters ($p_3, p_4, p_5$) estimate squares of the three quadratic phase parameters for each sub-image, so there is no sign information in them. The last two parameters ($p_6$ and $p_7$) estimate cross-terms, so there is sign information. For example, if the sign of $c_3$ is (arbitrarily) assumed to be positive, then the sign information from the parameters $p_6$ and $p_7$ allows determination of the signs of $c_4$ and $c_5$ with respect to $c_3$. When the sign of $c_3$ is assumed to be plus, the sign determinations are as shown in Table 1. However, the true sign of $c_3$ is still unresolved.

TABLE 1

| | $c_3 * c_5$ | $c_4 * c_5$ | | $c_3$ | $c_5$ | $c_4$ |
|---|---|---|---|---|---|---|
| sign | + | + | $\rightarrow$ | +(assumed) | + | + |
| sign | + | − | $\rightarrow$ | +(assumed) | + | − |
| sign | − | + | $\rightarrow$ | +(assumed) | − | − |
| sign | − | − | $\rightarrow$ | +(assumed) | − | + |

Resolving Overall Sign Ambiguities for Wavefront

The overall resolution of sign ambiguities for the whole wavefront requires additional computation. In particular, the magnitude of all quadratic phase aberrations for each sub-image must be determined with respect to a new reference image. The new reference image is one of the original sub-images. This additional computation is essentially the same as the previous computations set forth above.

The sign ambiguity (plus or minus) for each magnitude term is resolved by forming a triangle from the following three quantities: (i) the magnitude with respect to the original reference, (ii) the magnitude with respect to the new reference, and (iii) the magnitude of the new reference with respect to the original reference. Only one of the two signs (plus or minus) will permit the three legs of the triangle to match up, and that sign is the correct one for that magnitude.

The following gives an example of the procedure to resolve signs, as shown in Table 2 below. The example treats determination of signs for the coefficient $c_3$ for seven images, $s_0$ through $s_6$. In system operation the determination will be done for sub-images $s_0$ through $s_{N-1}$, where N is the total number of sub-images. Determination of signs for coefficients $c_4$ and $c_5$ is done in the same way.

Let the initial reference image be $s_0$. The magnitudes of the quadratic phase coefficients ($c_3$) are first calculated for each of the sub-images with respect to initial reference image ($s_0$).

The resolution procedure next chooses a new reference image that has large values for all three of the parameters ($c_3$, $c_4$ and $c_5$). Let the new reference image be $s_6$. The magnitudes of the quadratic phase coefficients ($c_3$) are now calculated for each the remaining sub-images with respect to the new reference image ($s_6$).

Table 2 shows the example for resolving signs for the $c_3$ phase magnitude for seven sub-images ($s_0$ through $s_6$) where so is the original reference image and $s_6$ is the new reference image.

TABLE 2

|  | Sub-image | | | | | | |
| --- | --- | --- | --- | --- | --- | --- | --- |
|  | $s_0$ | $s_1$ | $s_2$ | $s_3$ | $s_4$ | $s_5$ | $s_6$ |
| $C_3$ with respect to $s_0$ | 0 | 1 | 2 | 3 | 14 | 15 | 10 |
| $C_3$ with respect to $s_6$ | 10 | 9 | 12 | 7 | 24 | 5 | 0 |
| $C_3$ sign with respect to $s_0$ | 0 | 1 | −2 | 3 | −14 | 15 | 10 |

When signs have been resolved for all three coefficients ($c_3$, $c_4$, $c_5$), there are still three ambiguities, the three signs ($c_3$, $c_4$, $c_5$) for the location of the new reference ($s_6$) with respect to the original reference ($s_0$). The sign determination procedure explained previously allows determination of the sign of $c_4$ and $c_5$ with respect to $c_3$. Thus, the sign of $c_3$ is still unknown.

When the sign resolution procedure is completed, only one unknown sign remains for all the quadratic coefficients in all the sub-images. That single sign ambiguity must be resolved in some other way, perhaps through another sensor measurement.

The sign determination procedure explained above also allows checking of all signs to make sure there is not a mistake (due to noise, for example). In real-time system operation, the first sub-image $s_0$ might be chosen as the initial reference because it is the first reference read from the camera. Choosing the first sub-image as the initial reference speeds up data processing.

The new reference (designated $s_6$ in the example) should be chosen to have relatively large magnitudes for the three parameters ($c_3$, $c_4$, and $c_5$) to improve accuracy, particularly for determination of the signs of $c_4$ and $c_5$ with respect to $c_3$. After determination of the magnitude and sign of all quadratic coefficients, it may be desirable to shift all phase parameters, so some other sub-image is used as the origin.

Simulation of Quadratic Phase Determination

A Matlab® computer simulation was written to verify the efficacy of the least squares procedure to estimate the three quadratic phase coefficients ($c_3$, $c_4$, $c_5$). A reference image was input to the simulation. The simulation next implemented the procedure described above to create gradients of the reference image as well as a scene image with (input) quadratic phase coefficients. The Matlab® program then used the least squares procedure to estimate the (input) quadratic phase coefficients. As explained above with reference to Equation (1), the coefficients Ck are dimensionless, and values like 0.1 and 0.01 are considered reasonable.

An image can be represented by an N-by-N array of pixel values. For the present exemplary embodiment, Matlab® software was used to perform the Fourier Transform and the inverse Fourier Transform. In Matlab®, the two-dimensional discrete Fourier Transform of an image requires two commands, designated FFT2 and FFTSHIFT. The first command results in frequency values that go from zero to N−1. For image applications, the frequency values should be symmetric (about 0). The second command shifts the frequency values so they go from −N/2 to (N−1)/2. For the same reason, the inverse two-dimensional discrete Fourier Transform of an image requires two commands, designated IFFT2 and FFTSHIFT.

Figure 3:
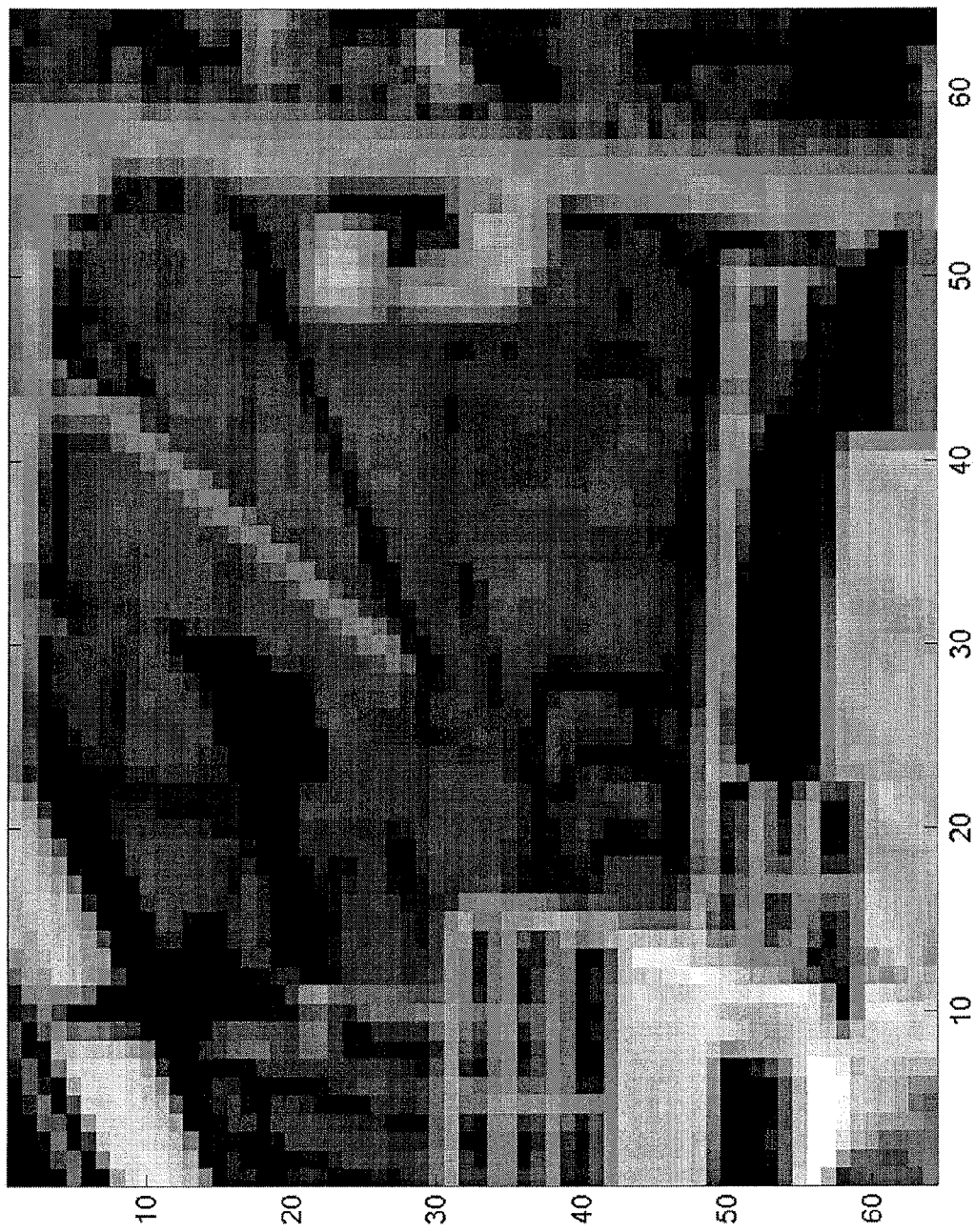
FIG. 3 illustrates a reference image used to illustrate one embodiment of the present invention.

FIG. 3 shows a 64-pixel by 64-pixel reference image used to illustrate the present exemplary embodiment of the present invention. The reference image has good contrast with minimal noise. Objects in the image have sharp edges. Other reference images, with poor contrast and smudged edges, might give less accuracy. The gradients for least square estimations are created by numerical differencing modified reference images with small changes in the three dimensionless quadratic coefficients. For this example, the changes ($\epsilon$) are set at 0.01.

As set forth above in greater detail, the estimation procedure with one scene image and one reference image has one unknown sign for the three parameters $c_3$, $c_4$ and $c_5$. In the simulation results presented here, the parameter $c_3$ is (arbitrarily) assumed to be positive, and the signs for $c_4$ and $c_5$ are then determined.

The simulation results for the present exemplary embodiment are summarized in Table 3. When the truth-values of the coefficients are in the neighborhood of 0.01, then the estimation procedure has accuracy better than 1%. When the truth-values are ten times larger, in the neighborhood of 0.1, the estimation procedure has accuracy about 5%.

TABLE 3

|  | $C_3$ | $C_4$ | $C_5$ |
| --- | --- | --- | --- |
| Truth | 0.02 | −0.01 | 0.005 |
| Estimate | 0.01995 | −0.00999 | 0.005005 |
| Truth | 0.2 | −0.1 | 0.05 |
| Estimate | 0.1935 | −0.10445 | 0.04672 |

The simulation results in Table 3 are for the image in FIG. 3 without added noise. Noise can be modeled by adding independent normal random variables to pixel values in the reference image and the scene image. The pixel values from FIG. 3 have mean 58 units and standard deviation 32 units. The noise example presented here has noise standard deviation 6 units (10% of the mean and 20% of the standard deviation of the scene). Gradient changes ($\epsilon$) are increased to 0.1 (from 0.01 used previously). For the following examples, truth-values for the quadratic coefficients are $c_3$=0.2, $c_4$=−0.1 and $c_5$=0.05. Truth-values for the linear coefficients are zero, and the linear coefficients $c_1$ and $c_2$ are estimated using a standard (parabolic fit) technique.

First, when there is no introduced noise, rms error for estimating $c_1$ and $c_2$ is 0.007. The rms error for estimating $c_3$, $c_4$, and $c_5$ is 0.008. Second, when there is introduced noise with standard deviation 6 units, the rms error for estimating $c_1$ and $C_2$ is still small at 0.008, while rms error for estimating $c_3$, $c_4$, and $c_5$ increases to 0.04. This example shows errors in quadratic coefficients are more sensitive to noise than errors in linear coefficients, but quadratic errors are still reasonable.

Simulation of Wavefront Reconstruction and One-Step Control

A Matlab® computer simulation was written to demonstrate wavefront reconstruction and one-step feedback control using quadratic phase coefficients. The simulation does not go through the estimation procedure described above to determine quadratic phase coefficients. Instead, it creates "ideal" quadratic phase coefficients from the phase at surrounding wavefront locations.

Figure 4:
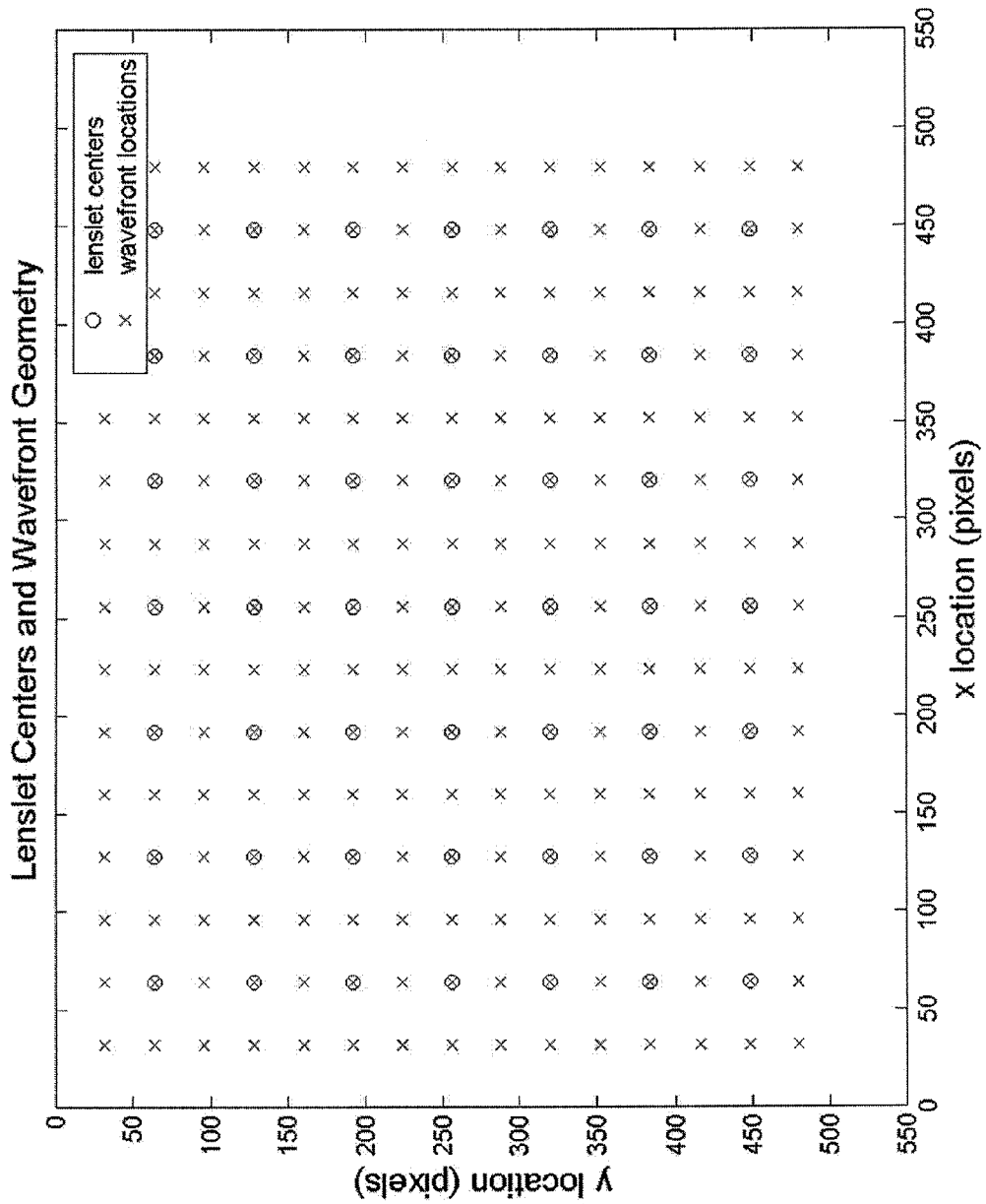
FIG. 4 illustrates the geometry for the lenslet centers and the wavefront locations in accordance with one aspect of the present invention.

For the example presented here, a 15-by-15 array of locations represents the wavefront. The (ideal) measurements are obtained from 49 lenslet locations in a 7-by-7 array. FIG. 4 shows the geometry for the 49 lenslet centers and the 225 (15-by-15) wavefront locations in accordance with the present exemplary embodiment of the invention. Each lenslet center is surrounded by eight wavefront locations. In FIG. 4 the lenslet centers and the wavefront locations are projected onto a 500-by-500 pixel sensor camera. Each lenslet center is separated by 64 pixels from each adjacent lenslet center. The lenslet sub-images will be somewhat less than 64-by-64 pixels because there must be a several pixel "guard band" around each sub-image, to ensure it does not overlap adjacent sub-images.

The measurement data includes phase coefficients $c_1$ through $c_5$ for each of the 49 sub-images. The coefficients $c_1$ (and $c_2$) are assumed to be the average of all horizontal (and vertical) phase slopes across the 3-by-3 set of wavefront values. The coefficients $c_3$ (and $c_4$) are the average of horizontal (and vertical) rate-of-change of phase slope across the 3-by-3 set. The coefficients $c_5$ (representing xy phase) are obtained from the four corner values in the 3-by-3 set.

The actuators are arranged in a Cartesian array behind the deformable mirror (e.g., reference numeral 103 in FIG. 1). For this explanation, it is convenient to consider the actuator center locations to be on the sensor camera in FIG. 4. The Fried geometry is the most common geometry for actuators. With that geometry, four actuators surround the center of each lenslet, one at each corner. That arrangement increases controllability, because the surrounding four actuators can be commanded to give desired local slope to the mirror (in the x and y direction). The Fried geometry would result in an 8-by-8 array of actuators. To make maximum use of the additional quadratic phase information, it was decided to simulate a larger array of actuators. Accordingly, a 12-by-12 array of actuators was used, distributed uniformly over the 15-by-15 array of wavefront locations in FIG. 4. The four corners of the actuator grid are co-located with the four corners of the wavefront grid. The influence function for each control actuator is a cone with radius equal to two wavefront array distances, so that every wavefront array location can be reached by at least one control actuator.

Feedback control laws for adaptive optics require sophisticated analysis, but for this example a simple one-step pseudo-inverse matrix control is used. The feedback control law has the two constraints described in above, the "average value" constraint and the "waffle" constraint. The overall wavefront is represented by 14 Zernike polynomials (up to x4 and y4). The coefficient for each polynomial is one (unity). The maximum value of the wavefront (at one corner) is around 20 and the minimum value is around 0.

First, to evaluate the pseudo-inverse matrix control for this example, assume there are ideal measurements of the wavefront values at the 15-by-15 grid of wavefront points. After one step of pseudo-inverse control, the standard deviation of wavefront error at each grid point is 0.27. Therefore, for this example, the best that can be done, with one-step pseudo-inverse matrix control, has wavefront standard deviation of 0.27. Second, to evaluate the standard Shack-Hartman sensor, assume there are ideal linear phase measurements $c_1$ and $c_2$ at each of the 49 sub-images in the 7-by-7 set. After one step pseudo-inverse matrix control, the wavefront standard deviation is 0.95. Third, to evaluate the effect of additional processing from the standard Shack-Hartmann sensor, assume there are ideal linear and quadratic phase measurements of $c_1$ through $c_5$ at each of the 49 sub-images in the 7-by-7 set. After one step pseudo-inverse control, the wavefront standard deviation is 0.41. To summarize this example, if the standard deviation of phase error using linear phase ($c_1$ and $c_2$) is 0.95, then the standard deviation using linear and quadratic phase ($c_1$ through $c_5$) is 0.41, and the standard deviation with the best that can be done with perfect wavefront measurements is 0.27.

According to one aspect of the present invention, the quadratic phase estimation described above is for scene-based images which have incoherent optics. In certain other embodiments of the present invention, quadratic phase estimation may be employed for scene-based images with coherent optics, or for point source optics, whether coherent or incoherent.

In accordance with certain aspects of the present invention, real-time quadratic phase information has the potential for improvement (a) in system diagnostics and (b) in operational systems that use local curvature actuation or moment actuation. For example, "waffle" mode aberrations in the deformable mirror are unobservable by the feedback control, but they do affect system performance. Real-time information about such unobservable modes can help in test bed and system diagnostics. Local curvature actuation or moment actuation use influence functions that map to alternative sensors which detect local curvature instead of slope. The same wavefront sensor that measures local slope can provide real-time higher order phase information to implement local curvature actuation or moment actuation.

Figure 5:
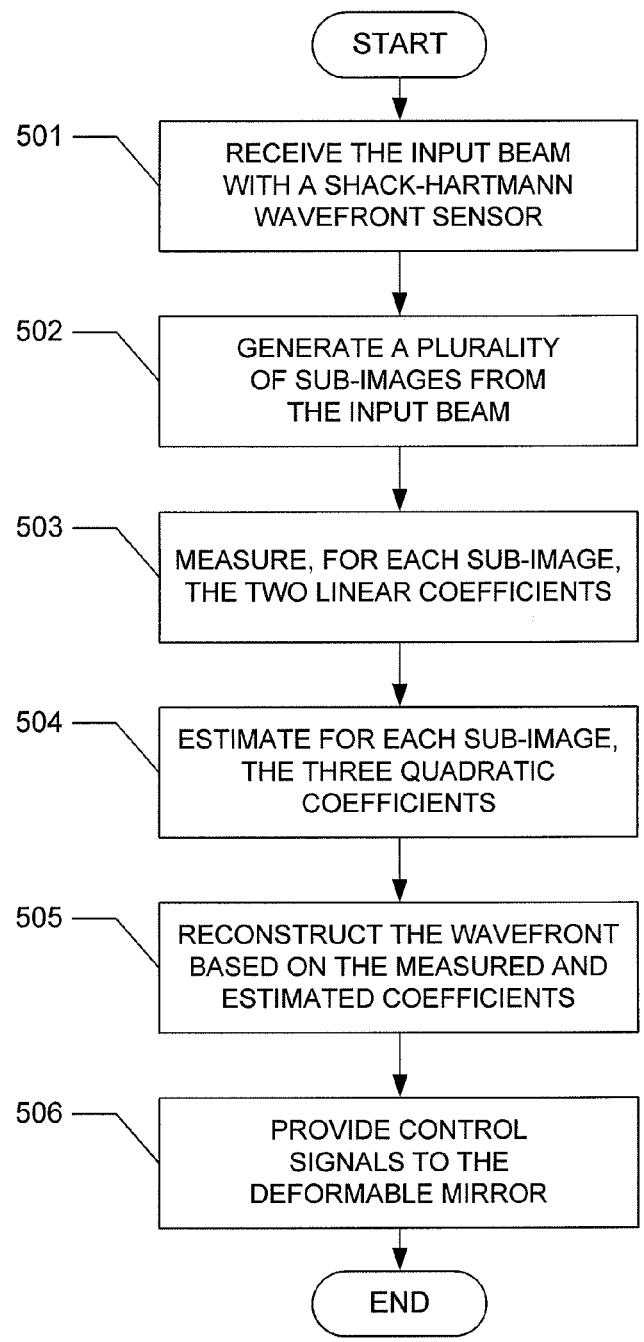
FIG. 5 is a flowchart illustrating a method of mitigating aberrations in an input beam with an aberrated wavefront in accordance with one embodiment of the present invention.

FIG. 5 is a flowchart illustrating a method of mitigating aberrations in an input beam with an aberrated wavefront in accordance with one embodiment of the present invention. The method begins in step 501, in which an input beam with an aberrated wavefront is received with Shack-Hartmann wavefront sensor. In step 502, the Shack-Hartmann wavefront sensor generates a plurality of sub-images from the input beam. Each sub-image corresponds to a local wavefront aberration with two linear coefficients (e.g., x and y) and three quadratic coefficients (e.g., $x^2$, $y^2$ and xy). In step 503, the two linear coefficients for each sub-image are measured using correlation techniques (e.g., comparing each sub-image against one reference sub-image) to produce two measurements of relative wavefront slope at the lenslet center. In step 504, the three quadratic coefficients for each sub-image are estimated using a least squares estimation method, as described more fully above. In step 505, the information about the slope (e.g., the two linear coefficients and the three quadratic coefficients) at each lenslet is combined to provide a reconstructed wavefront corresponding to the aberrated wavefront of the input beam. In step 506, control signals, based upon the reconstructed wavefront, are provided to the actuators of a deformable mirror to mitigate the aberrations in the input beam.

Figure 6:
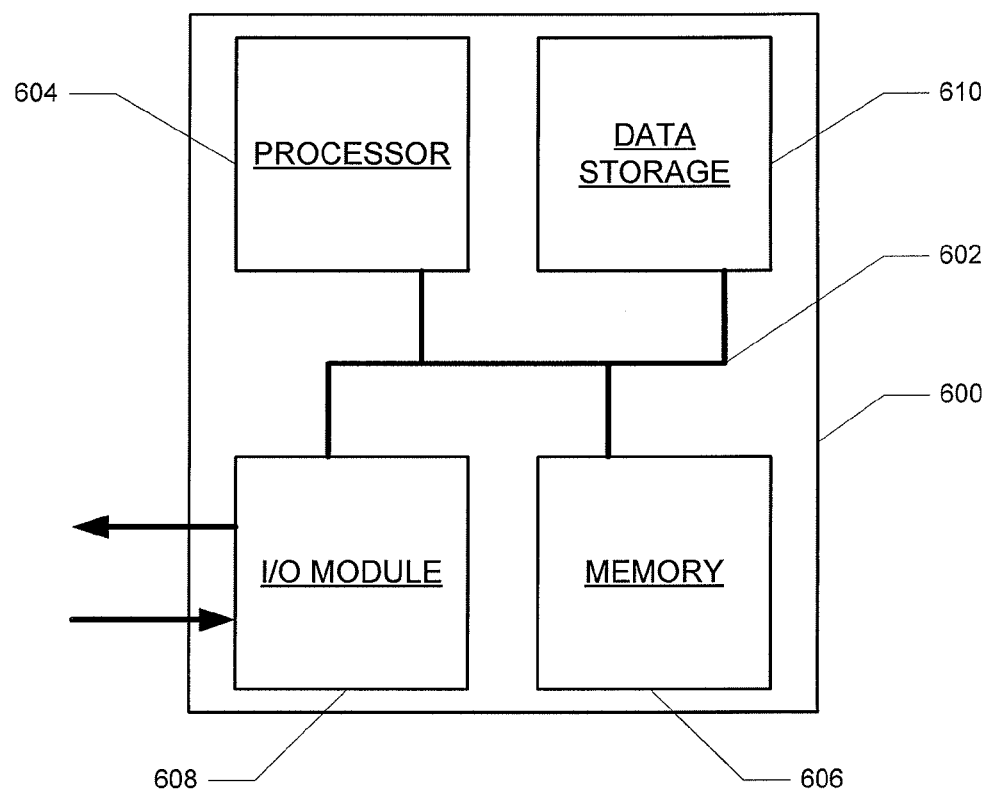
FIG. 6 is a block diagram that illustrates a computer system upon which an embodiment of the present invention may be implemented

FIG. 6 is a block diagram that illustrates a computer system 600 upon which an embodiment of the present invention may be implemented. Computer system 600 includes a bus 602 or other communication mechanism for communicating information, and a processor 604 coupled with bus 602 for processing information. Computer system 600 also includes a memory 606, such as a random access memory ("RAM") or other dynamic storage device, coupled to bus 602 for storing information and instructions to be executed by processor 604. Memory 606 may also be used for storing temporary variable or other intermediate information during execution of instructions to be executed by processor 604. Computer system 600 further includes a data storage device 610, such as a magnetic disk or optical disk, coupled to bus 602 for storing information and instructions.

Computer system 600 may be coupled via I/O module 608 to a display device (not illustrated), such as a cathode ray tube ("CRT") or liquid crystal display ("LCD") for displaying information to a computer user. An input device, such as, for example, a keyboard or a mouse may also be coupled to computer system 600 via I/O module 608 for communicating information and command selections to processor 604.

According to one embodiment of the invention, estimating aberrations in an input beam with an aberrated wavefront is performed by a computer system 600 in response to processor 604 executing one or more sequences of one or more instructions contained in memory 606. Such instructions may be read into memory 606 from another machine-readable medium, such as data storage device 610. Execution of the sequences of instructions contained in main memory 606 causes processor 604 to perform the process steps described herein. One or more processors in a multi-processing arrangement may also be employed to execute the sequences of instructions contained in memory 606. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 604 for execution. Such a medium may take many forms, including, but not limited to, non-volatile media, volatile media, and transmission media. Non-volatile media include, for example, optical or magnetic disks, such as data storage device 610. Volatile media include dynamic memory, such as memory 606. Transmission media include coaxial cables, copper wire, and fiber optics, including the wires that comprise bus 602. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention. For instance, various numerical ranges such as the ranges for the far field, near region and operating frequencies are provided by way of example and not by way of limitation.

There may be many other ways to implement the invention. Various functions and elements described herein may be partitioned differently from those shown without departing from the sprit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. An adaptive optics system comprising:
a deformable mirror configured to receive an input beam with an aberrated wavefront and to reflect the input beam to a Shack-Hartmann wavefront sensor array;
the Shack-Hartmann wavefront sensor array configured to receive the input beam from the deformable mirror and to generate a plurality of sub-images from the input beam; and
a processor configured to:
measure, for each sub-image, two linear coefficients corresponding to a local wavefront aberration of the sub-image;
estimate, for each sub-image, three quadratic coefficients corresponding to the local wavefront aberration of the sub-image;
reconstruct the aberrated wavefront of the input beam based on the measured linear coefficients and the estimated quadratic coefficients; and
provide control signals based upon the reconstructed wavefront to the deformable mirror to mitigate aberrations in the input beam.

2. The adaptive optics system of claim 1, further comprising an image sensor configured to record the plurality of sub-images and to provide the recorded sub-images to the processor.

3. The adaptive optics system of claim 1, wherein the Shack-Hartmann wavefront sensor includes an array of lenslets.

4. The adaptive optics system of claim 1, wherein the processor is configured to measure the two linear coefficients for each sub-image by correlating each sub-image to a reference sub-image to calculate a linear offset of an image center of each sub-image.

5. The adaptive optics system of claim 1, wherein the processor is configured to estimate the three quadratic coefficients for each sub-image using a least squares estimation.

6. The adaptive optics system of claim 1, wherein the processor is configured to estimate each of the three quadratic coefficients for each sub-image by:
selecting one of the plurality of sub-images;
Fourier transforming the selected sub-image;
multiplying the Fourier transformed sub-image by an optical transfer function of the Shack-Hartmann wavefront sensor which corresponds to one of the three quadratic coefficients to generate a product;
inverse Fourier transforming the product to generate a modified sub-image;
calculating a difference between the modified sub-image and the sub-image;
squaring the calculated difference; and resolving the sign of the square to generate an estimated quadratic coefficient for the sub-image.

7. The adaptive optics system of claim 1, further comprising:
a beamsplitter disposed between the deformable mirror and the Shack-Hartmann wavefront sensor, the beamsplitter configured to divert a portion of the input beam to a scene camera; and
the scene camera.

8. The adaptive optics system of claim 1, wherein each local wavefront aberration includes two linear coefficients and five quadratic coefficients, and wherein the processor is configured to estimate the five quadratic coefficients.

9. The adaptive optics system of claim 1, wherein the control signals are provided to the deformable mirror in real time or near-real time.

10. A method of mitigating aberrations in an input beam with an aberrated wavefront, comprising the steps of:
receiving the input beam with a Shack-Hartmann wavefront sensor;
generating, with the Shack-Hartmann wavefront sensor, a plurality of sub-images from the input beam;
measuring, for each sub-image, two linear coefficients corresponding to a local wavefront aberration of the sub-image;
estimating, for each sub-image, three quadratic coefficients corresponding to the local wavefront aberration of the sub-image;
reconstructing the aberrated wavefront of the input beam based on the measured linear coefficients and the estimated quadratic coefficients; and
providing control signals based upon the reconstructed wavefront to a deformable mirror to mitigate aberrations in the input beam.

11. The method of claim 10, wherein the Shack-Hartmann wavefront sensor includes an array of lenslets.

12. The method of claim 10, wherein the step of measuring the two linear coefficients for each sub-image includes correlating each sub-image to a reference sub-image to calculate a linear offset of an image center of each sub-image.

13. The method of claim 10, wherein the step of estimating the three quadratic coefficients for each sub-image includes using a least squares estimation.

14. The method of claim 10, wherein the step of estimating the three quadratic coefficients for each sub-image includes estimating each quadratic coefficient by:
selecting one of the plurality of sub-images;
Fourier transforming the selected sub-image;
multiplying the Fourier transformed sub-image by an optical transfer function of the Shack-Hartmann wavefront sensor which corresponds to one of the three quadratic coefficients to generate a product;
inverse Fourier transforming the product to generate a modified sub-image;
calculating a difference between the modified sub-image and the sub-image;
squaring the calculated difference; and
resolving the sign of the square to generate an estimated quadratic coefficient for the sub-image.

15. The method of claim 10, wherein each local wavefront aberration includes two linear coefficients and five quadratic coefficients, and wherein the step of estimating includes estimating the five quadratic coefficients.

16. The method of claim 10, wherein the control signals are provided to the deformable mirror in real time or near-real time.

17. A machine-readable medium carrying one or more sequences of instructions for mitigating aberrations in an input beam with an aberrated wavefront, wherein execution of the one or more sequences of instructions by one or more processors causes the one or more processors to perform the steps of:
generating, with a Shack-Hartmann wavefront sensor, a plurality of sub-images from an input beam;
measuring, for each sub-image, two linear coefficients corresponding to a local wavefront aberration of the sub-image;
estimating, for each sub-image, three quadratic coefficients corresponding to the local wavefront aberration of the sub-image;
reconstructing the aberrated wavefront of the input beam based on the measured linear coefficients and the estimated quadratic coefficients; and
providing control signals based upon the reconstructed wavefront to a deformable mirror to mitigate aberrations in the input beam.

18. The machine-readable medium of claim 17, wherein the step of estimating the three quadratic coefficients for each sub-image includes using a least squares estimation.

19. The machine-readable medium of claim 17, wherein the step of estimating the three quadratic coefficients for each sub-image includes estimating each quadratic coefficient by:
selecting one of the plurality of sub-images;
Fourier transforming the selected sub-image;
multiplying the Fourier transformed sub-image by an optical transfer function of the Shack-Hartmann wavefront sensor which corresponds to one of the three quadratic coefficients to generate a product;
inverse Fourier transforming the product to generate a modified sub-image;
calculating a difference between the modified sub-image and the sub-image;
squaring the calculated difference; and
resolving the sign of the square to generate an estimated quadratic coefficient for the sub-image.

* * * * *